US012481302B2

(12) United States Patent
Takada

(10) Patent No.: US 12,481,302 B2
(45) Date of Patent: Nov. 25, 2025

(54) CONSTANT VOLTAGE CIRCUIT

(71) Applicant: ABLIC Inc., Nagano (JP)

(72) Inventor: Kosuke Takada, Nagano (JP)

(73) Assignee: ABLIC Inc., Nagano (JP)

( * ) Notice: Subject to any disclaimer, the term of this patent is extended or adjusted under 35 U.S.C. 154(b) by 222 days.

(21) Appl. No.: 18/393,604

(22) Filed: Dec. 21, 2023

(65) Prior Publication Data

US 2024/0210981 A1 Jun. 27, 2024

(30) Foreign Application Priority Data

Dec. 27, 2022 (JP) ................................. 2022-209148

(51) Int. Cl.
*G05F 3/24* (2006.01)
*G05F 1/46* (2006.01)
*G05F 1/565* (2006.01)

(52) U.S. Cl.
CPC .............. *G05F 3/242* (2013.01); *G05F 1/468* (2013.01); *G05F 1/565* (2013.01)

(58) Field of Classification Search
CPC ........... G05F 1/468; G05F 1/565; G05F 3/242
See application file for complete search history.

(56) References Cited

U.S. PATENT DOCUMENTS

2017/0033687 A1* 2/2017 Gilliland ................... G05F 3/16
2020/0136606 A1* 4/2020 Watanabe ............... G05F 3/242
2020/0257325 A1* 8/2020 Sakaguchi ............. H10D 84/84

FOREIGN PATENT DOCUMENTS

JP 2011113321 6/2011

* cited by examiner

*Primary Examiner* — Jue Zhang
*Assistant Examiner* — Lakaisha Jackson
(74) *Attorney, Agent, or Firm* — JCIPRNET

(57) ABSTRACT

Provided is a constant voltage circuit with which a variation of an output voltage in response to a sudden change of a power supply voltage is small. The constant voltage circuit includes: an ED-type reference voltage circuit including at least two depletion mode transistors and an enhancement mode transistor which are connected in series; a depletion mode transistor connected in series between the power supply terminal and the ED-type reference voltage circuit; a first output terminal or a second output terminal; and a power supply variation suppression circuit which is connected between a connection point and the ground terminal and which suppresses a variation of the power supply voltage. The power supply variation suppression circuit includes a detection circuit which detects whether there is a variation of the power supply voltage, and a pass transistor which is connected in parallel to the detection circuit.

6 Claims, 7 Drawing Sheets

CONSTANT VOLTAGE CIRCUIT

CROSS-REFERENCE TO RELATED APPLICATION

This application claims the priority benefits of Japanese patent application no. 2022-209148, filed on Dec. 27, 2022. The entirety of the above-mentioned patent application is hereby incorporated by reference herein and made a part of this specification.

BACKGROUND OF THE INVENTION

1. Field of the Invention

The present invention relates to a constant voltage circuit.

2. Description of the Related Art

In general, a variation of an output voltage of a constant voltage circuit in response to a sudden change of a power supply voltage is desired to be small. As an example, there is a constant voltage circuit including a plurality of depletion mode NMOS transistors which are connected in series (see, for example, Japanese Patent Application Laid-open No. 2011-113321). However, with the related-art constant voltage circuit, a sudden change of the power supply voltage is propagated to output via a parasitic capacitance which exists between a drain and source of each depletion mode NMOS transistor.

SUMMARY OF THE INVENTION

In view of the above-mentioned circumstances, the present invention provides a constant voltage circuit with which a variation of an output voltage in response to a sudden change of a power supply voltage is small.

According to at least one embodiment of the present invention, there is provided a constant voltage circuit including: a power supply terminal configured to supply a power supply voltage; a ground terminal; an ED-type reference voltage circuit including at least a first depletion mode transistor and a second depletion mode transistor, and an enhancement mode transistor, the first depletion mode transistor, the second depletion mode transistor, and the enhancement mode transistor being connected in series and having gates connected to one another; a third depletion mode transistor connected in series between the power supply terminal and the ED-type reference voltage circuit; a power supply variation suppression circuit connected between a first connection point and the ground terminal and configured to suppress a variation of the power supply voltage, the first connection point being a connection point between the third depletion mode transistor and the ED-type reference voltage circuit; and an output terminal connected to a connection point which is any one of a second connection point and the first connection point, the second connection point being a connection point between the first depletion mode transistor and the enhancement mode transistor, the power supply variation suppression circuit including: a detection circuit including a first terminal connected to the first connection point, a second terminal connected to the ground terminal, and a third terminal for supplying a detection signal including a signal level corresponding to whether the variation of the power supply voltage exceeds a set range; and a pass transistor including a gate connected to the third terminal of the detection circuit, a source connected to one of the first terminal and the second terminal of the detection circuit, and a drain connected to another one of the first terminal and the second terminal of the detection circuit, and being switchable between an on state and an off state depending on the signal level applied to the gate.

According to the present invention, the constant voltage circuit with which the variation of the output voltage in response to a sudden change of the power supply voltage is small can be provided.

DESCRIPTION OF THE EMBODIMENTS

Now, a constant voltage circuit according to embodiments of the present invention is described with reference to the drawings.

First Embodiment

Figure 1:
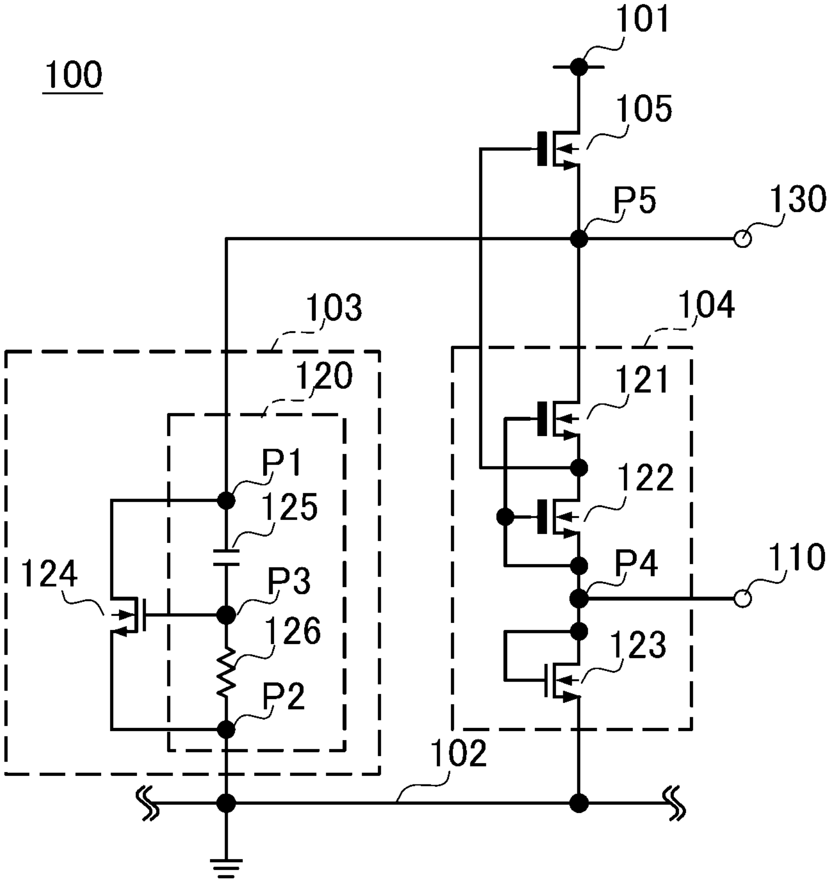
FIG. 1 is a circuit diagram for illustrating a configuration example of a constant voltage circuit according to a first embodiment of the present invention.

FIG. 1 is a circuit diagram of a constant voltage circuit 100 serving as an example of a constant voltage circuit according to a first embodiment of the present invention.

The constant voltage circuit 100 includes a power supply terminal 101, a ground terminal 102, an ED-type reference voltage circuit 104, a power supply variation suppression circuit 103, a depletion mode N-channel MOS transistor (hereinafter referred to "NMOS transistor") 105, a first output terminal 110, and a second output terminal 130. The ground terminal 102 is a power supply terminal for supplying a power supply voltage of 0 V (zero volts) (hereinafter referred to as "ground voltage") as an example of a power supply voltage serving as a reference of a circuit operation.

The ED-type reference voltage circuit 104 includes a plurality of, for example, two depletion mode NMOS transistors 121 and 122, and at least one enhancement mode NMOS transistor 123. The depletion mode NMOS transistor 121 and the NMOS transistor 122 serving as a first depletion mode NMOS transistor are connected in series. The depletion mode NMOS transistor 122 and the NMOS transistor 123 are connected in series.

The depletion mode NMOS transistor 121 has a drain connected to a source of the depletion mode NMOS transistor 105. A connection point between the drain of the depletion mode NMOS transistor 121 and the depletion mode NMOS transistor 105 forms a connection point P5 between the ED-type reference voltage circuit 104 and the NMOS transistor 105 serving as a third depletion mode transistor.

More specifically, the NMOS transistor 123 has a gate connected to its own drain, the first output terminal 110, and a source of the depletion mode NMOS transistor 122. The depletion mode NMOS transistor 122 has a gate connected to its own source and a gate of the depletion mode NMOS transistor 121. That is, the gate of each of the depletion mode NMOS transistors 122 and 123 is connected to a connection point P4 between the source of the depletion mode NMOS transistor 122 and the drain of the NMOS transistor 123. Further, the gate of the depletion mode NMOS transistor 121 and the first output terminal 110 are connected to the connection point P4 serving as a second connection point.

The power supply variation suppression circuit 103 includes a detection circuit 120 and an NMOS transistor 124 serving as a pass transistor. The detection circuit 120 is configured as, for example, a three-terminal circuit including three terminals, and includes a capacitor 125 and a resistor 126 connected in series to the capacitor 125.

The resistor 126 includes a first terminal connected to a source of the NMOS transistor 124 and a second terminal connected to a gate of the NMOS transistor 124. The capacitor 125 includes a first terminal connected to the resistor 126 (in more detail, the second terminal thereof) and a second terminal connected to a drain of the NMOS transistor 124.

A connection point P1 between the capacitor 125 and the drain of the NMOS transistor 124, that is, the second terminal of the capacitor 125, forms a first terminal of the detection circuit 120. A connection point P2 between the resistor 126 and the source of the NMOS transistor 124, that is, the first terminal of the resistor 126, forms a second terminal of the detection circuit 120. A connection point P3 between the capacitor 125 and the resistor 126 forms a third terminal of the detection circuit 120.

The connection point P1 is the same node as the connection point P5 serving as a first connection point. That is, the second terminal of the capacitor 125 and the drain of the NMOS transistor 124 are connected to the source of the depletion mode NMOS transistor 105, the second output terminal 130, and the drain of the depletion mode NMOS transistor 121. The connection point P2 is connected to the ground terminal 102 and the source of the NMOS transistor 123.

The depletion mode NMOS transistor 105 has a drain connected to the power supply terminal 101, a gate connected to the source of the depletion mode NMOS transistor 121 and the drain of the depletion mode NMOS transistor 122, and the source connected to the second output terminal 130, the drain of the depletion mode NMOS transistor 121, the second terminal of the capacitor 125, and the drain of the NMOS transistor 124.

Next, an operation of the constant voltage circuit 100 is described.

The power supply terminal 101 supplies a predetermined power supply voltage. The ground terminal 102 supplies the ground voltage.

The depletion mode NMOS transistors 121 and 122 connected in series generates a constant current with use of a voltage of the connection point P5 as a power source. The constant current generated by the depletion mode NMOS transistors 121 and 122 is supplied to the NMOS transistor 123 to generate a constant voltage at the drain. The ED-type reference voltage circuit 104 generates the constant voltage in this manner and supplies the constant voltage from the first output terminal 110.

The depletion mode NMOS transistor 105 operates as a source follower. Specifically, the depletion mode NMOS transistor 105 generates, at the connection point P5, a voltage obtained by adding an absolute value of a threshold to a source voltage of the depletion mode NMOS transistor 121. The voltage generated at the connection point P5 is supplied from the second output terminal 130.

Under a state in which the voltage of the power supply terminal 101 is stable and a sufficient period of time has elapsed (hereinafter referred to as "steady state"), the voltage of the connection point P5 is charged in the capacitor 125. No DC current flows through the resistor 126. Thus, a voltage across both terminals of the resistor 126 is 0 V. A voltage between the gate and source of the NMOS transistor 124 is 0 V. Thus, the NMOS transistor 124 is in an off state.

It is assumed that, from the above-mentioned steady state, for example, the voltage of the power supply terminal 101 has suddenly increased and the voltage of the connection point P5 has increased via a parasitic capacitance existing between the drain and source of the depletion mode NMOS transistor 105. The increased voltage of the connection point P5 causes a charging current to flow through the capacitor 125 and the resistor 126 to increase the gate voltage of the NMOS transistor 124.

The NMOS transistor 124 is turned on if the gate voltage exceeds a threshold voltage. With the NMOS transistor 124 being turned on, the connection point P5 and the ground terminal 102 are connected via the NMOS transistor 124. Thus, the increase of the voltage of the connection point P5 is suppressed. Then, a variation of an output voltage of the ED-type reference voltage circuit 104 which uses the voltage of the connection point P5 as the power source, that is, the voltage of the first output terminal 110, is suppressed. In the constant voltage circuit 100, the first output terminal 110 can supply a more accurate voltage than that of the second output terminal 130.

As described above, according to the constant voltage circuit 100, even in a case in which the parasitic capacitance exists between the drain and source of the depletion mode NMOS transistor 105, with the power supply variation suppression circuit 103, the variation of the output voltage supplied from the first output terminal 110 and the second output terminal 130 in response to a sudden change of the power supply voltage can be reduced. Consequently, according to the constant voltage circuit 100, it is possible to provide the constant voltage circuit with which the variation of the output voltage in response to a sudden change of the power supply voltage is smaller than in the related-art constant voltage circuit.

According to the constant voltage circuit 100, the power supply variation suppression circuit 103 includes the NMOS transistor 124, the capacitor 125, and the resistor 126. Thus, the variation of the output voltage in response to a sudden change of the power supply voltage can be reduced without complicating the configuration of the constant voltage circuit 100. Further, with the power supply variation suppression circuit 103, the capacitor 125 can be made smaller than in a power supply variation suppression circuit formed of a single capacitor. Thus, the entire power supply variation suppression circuit 103 can be formed to have a smaller size than that of the power supply variation suppression circuit formed of a single capacitor. Consequently, according to the constant voltage circuit 100, while the increase in area caused by the addition of the configuration for reducing the variation of the output voltage in response to a sudden change of the power supply voltage is minimized, it is possible to reduce the variation of the output voltage in response to a sudden change of the power supply voltage.

Second Embodiment

Figure 2:
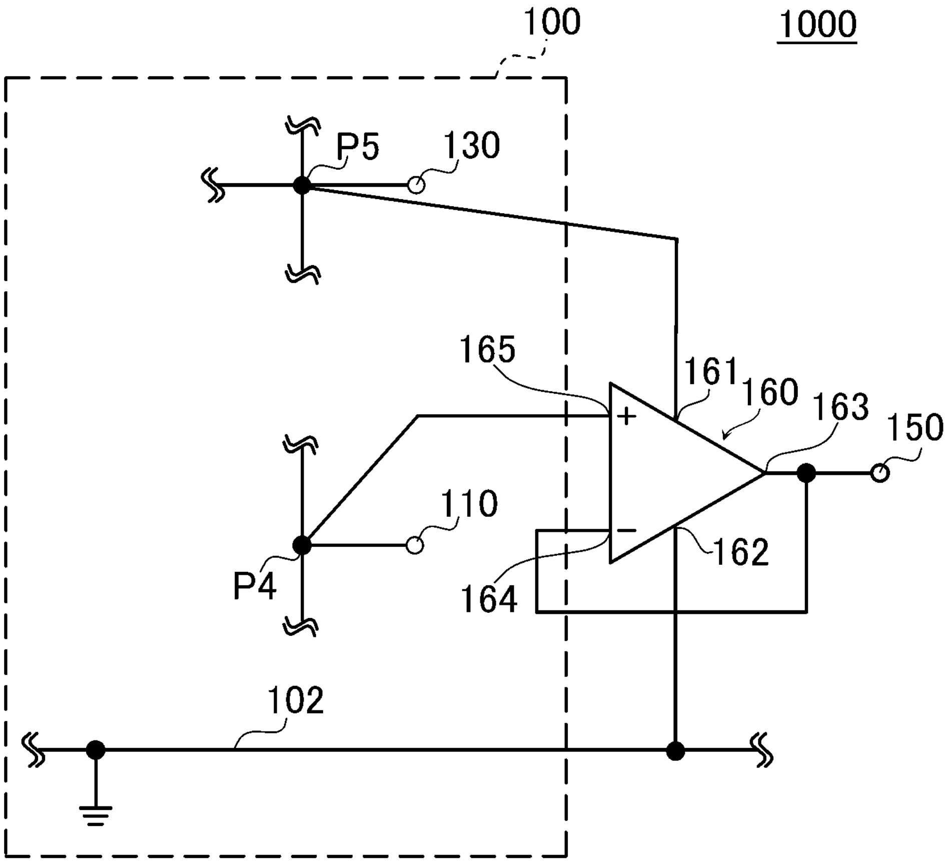
FIG. 2 is a partial circuit diagram for illustrating a configuration example of a constant voltage circuit according to a second embodiment of the present invention.

FIG. 2 is a partial circuit diagram of a constant voltage circuit 1000 serving as an example of a constant voltage circuit according to a second embodiment of the present invention.

The constant voltage circuit 1000 differs from the constant voltage circuit 100 in further including an operational amplifier 160, but does not substantially differ therefrom in other points. Accordingly, in the description of the second embodiment, the operational amplifier 160 is mainly described, and components that do not substantially differ from corresponding components of the constant voltage circuit 100 are denoted by the same reference symbols and description thereof is omitted.

The constant voltage circuit 1000 further includes the operational amplifier 160 in addition to the constant voltage circuit 100. The operational amplifier 160 includes a positive power supply terminal 161, a negative power supply terminal 162, an output terminal 163, an inverting input terminal 164, and a non-inverting input terminal 165. The positive power supply terminal 161 is connected to the second output terminal 130. The negative power supply terminal 162 is connected to the ground terminal 102. The output terminal 163 is connected to a third output terminal 150. The inverting input terminal 164 serving a first input terminal is connected to the third output terminal 150. The non-inverting input terminal 165 serving a second input terminal is connected to the first output terminal 110.

Next, an operation of the constant voltage circuit 1000 is described.

It is assumed that, for example, the voltage of the power supply terminal 101 (see FIG. 1) has suddenly increased and the voltage of the connection point P5 has increased via a parasitic capacitance existing between the drain and source of the depletion mode NMOS transistor 105 (see FIG. 1). At this time, in the same manner as in the constant voltage circuit 100, the variation of the voltage of the first output terminal 110 and the second output terminal 130 is suppressed by the power supply variation suppression circuit 103.

The operational amplifier 160 receives the voltage of the second output terminal 130 at the positive power supply terminal 161 and receives the ground voltage of the ground terminal 102 from the negative power supply terminal 162 to operate as a voltage follower. The operational amplifier 160 buffers a voltage appearing at the first output terminal 110 and supplies the voltage to the third output terminal 150 via the output terminal 163. Regarding the voltage of the second output terminal 130, the variation of the output voltage in response to a sudden change of the power supply voltage of the power supply terminal 101 is small. Thus, regarding the output voltage supplied from the third output terminal 150 as well, the variation of the voltage in response to a sudden change of the power supply voltage can be reduced.

As described above, according to the constant voltage circuit 1000, effects similar to those of the constant voltage circuit 100 can be obtained. That is, according to the constant voltage circuit 1000, the variation of the output voltage supplied from the first output terminal 110, the second output terminal 130, and the third output terminal 150 in response to a sudden change of the power supply voltage can be reduced. Further, according to the constant voltage circuit 1000, the variation of the output voltage in response to a sudden change of the power supply voltage can be reduced without complicating the configuration of the constant voltage circuit 1000. In addition, according to the constant voltage circuit 1000, while the increase in area caused by the addition of the configuration for reducing the variation of the output voltage in response to a sudden change of the power supply voltage is minimized, it is possible to reduce the variation of the output voltage in response to a sudden change of the power supply voltage.

Further, according to the constant voltage circuit 1000, with the provision of the operational amplifier 160 which functions as the voltage follower, it is possible to provide the constant voltage circuit with which the variation of the output voltage in response to a sudden change of the power supply voltage is reduced at a lower output impedance than that of the related-art constant voltage circuit.

In the constant voltage circuit 1000 described above, the voltage can be supplied from the first output terminal 110, the second output terminal 130, and the third output terminal 150, but the first output terminal 110 may be omitted. Further, the constant voltage circuit 1000 illustrated as an example in FIG. 2 is an example in which the constant voltage circuit 100 is included, but the constant voltage circuit 1000 may include, in place of the constant voltage circuit 100, any one of constant voltage circuits 200, 300, 400, 500, and 600 described later.

Next, each of the constant voltage circuits 200, 300, 400, 500, and 600 is described as some modification examples of the constant voltage circuit according to the embodiments.

First Modification Example

Figure 3:
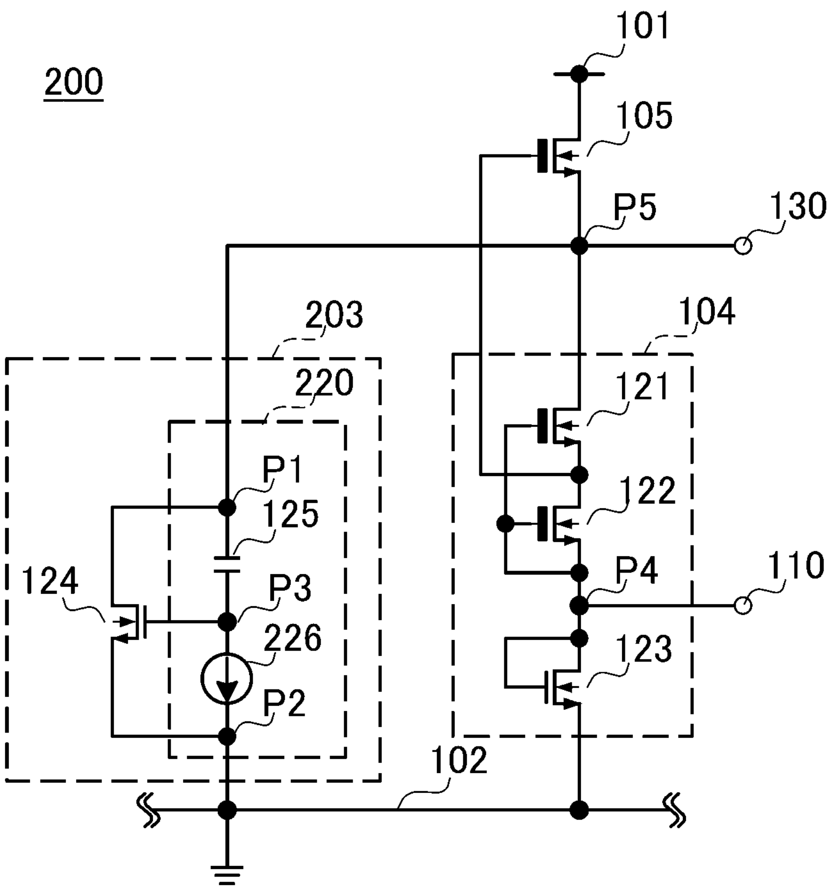
FIG. 3 is a circuit diagram for illustrating a first modification example of the constant voltage circuit according to the embodiments.

FIG. 3 is a circuit diagram of the constant voltage circuit 200 serving as a first modification example of the constant voltage circuit according to the embodiments.

The constant voltage circuit 200 differs from the constant voltage circuit 100 (see FIG. 1) in including a power supply variation suppression circuit 203 in place of the power supply variation suppression circuit 103, but does not substantially differ therefrom in other points. Accordingly, in the description of the first modification example, the power supply variation suppression circuit 203 is mainly described, and components that do not substantially differ from corresponding components of the constant voltage circuit 100 are denoted by the same reference symbols and description thereof is omitted.

The power supply variation suppression circuit 203 differs from the power supply variation suppression circuit 103 in including a detection circuit 220 in place of the detection circuit 120, but does not substantially differ therefrom in other points. The detection circuit 220 differs from the detection circuit 120 in including a constant current source 226 in place of the resistor 126, but does not substantially differ therefrom in other points.

The constant current source 226 includes a first terminal connected to the source of the NMOS transistor 124 and a second terminal connected to the gate of the NMOS transistor 124. The capacitor 125 includes a first terminal connected to the constant current source 226 (in more detail, the second terminal thereof) and a second terminal connected to the drain of the NMOS transistor 124. The second terminal of the capacitor 125 is further connected to the source of the depletion mode NMOS transistor 105, the drain of the depletion mode NMOS transistor 121, and the second output terminal 130. The first terminal of the constant current source 226 is further connected to the ground terminal 102 and the source of the NMOS transistor 123.

Next, an operation of the constant voltage circuit 200 is described.

The constant current source 226 is defined as an element which cannot supply a constant current unless a potential difference exists between its terminals. Under the steady state, the voltage of the connection point P5 is charged in the capacitor 125. A voltage across both terminals of the constant current source 226 is 0 V, and no DC current flows through the constant current source 226. A voltage between the gate and source of the NMOS transistor 124 is 0 V, and is in an off state.

It is assumed that, for example, the voltage of the power supply terminal 101 has suddenly increased and the voltage of the connection point P5 has increased via a parasitic capacitance existing between the drain and source of the depletion mode NMOS transistor 105. The increased voltage of the connection point P5 causes, because the impedance of the constant current source 226 is very high, the gate voltage of the NMOS transistor 124 to increase via the capacitor 125. Other operations do not substantially differ from those of the constant voltage circuit 100. Thus, description thereof is omitted.

As described above, according to the constant voltage circuit 200, effects similar to those of the constant voltage circuit 100 can be obtained. That is, according to the constant voltage circuit 200, even in a case in which the parasitic capacitance exists between the drain and source of the depletion mode NMOS transistor 105, with the power supply variation suppression circuit 203, the variation of the output voltage supplied from the first output terminal 110 and the second output terminal 130 in response to a sudden change of the power supply voltage can be reduced.

Further, the variation of the output voltage in response to a sudden change of the power supply voltage can be reduced without complicating the configuration of the constant voltage circuit 200. In addition, while the increase in area caused by the addition of the configuration for reducing the variation of the output voltage in response to a sudden change of the power supply voltage is minimized, it is possible to reduce the variation of the output voltage in response to a sudden change of the power supply voltage.

Second Modification Example

Figure 4:
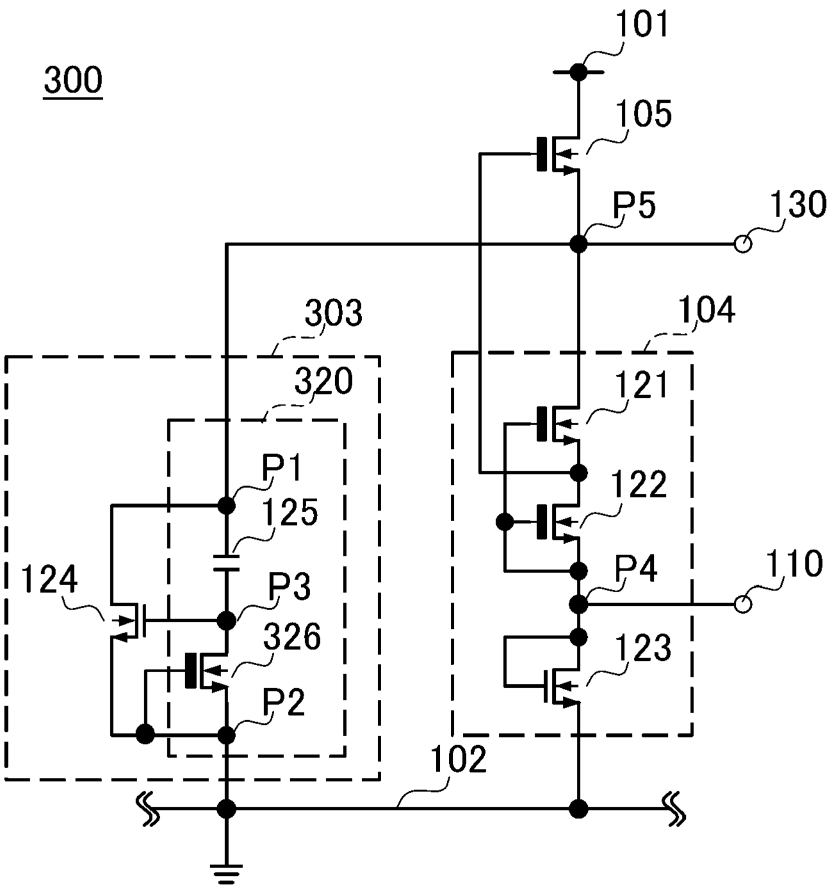
FIG. 4 is a circuit diagram for illustrating a second modification example of the constant voltage circuit according to the embodiments.

FIG. 4 is a circuit diagram of the constant voltage circuit 300 serving as a second modification example of the constant voltage circuit according to the embodiments.

The constant voltage circuit 300 differs from the constant voltage circuit 100 (see FIG. 1) in including a power supply variation suppression circuit 303 in place of the power supply variation suppression circuit 103, but does not substantially differ therefrom in other points. Accordingly, in the description of the second modification example, the power supply variation suppression circuit 303 is mainly described, and components that do not substantially differ from corresponding components of the constant voltage circuit 100 are denoted by the same reference symbols and description thereof is omitted.

The power supply variation suppression circuit 303 differs from the power supply variation suppression circuit 103 in including a detection circuit 320 in place of the detection circuit 120, but does not substantially differ therefrom in other points. The detection circuit 320 differs from the detection circuit 120 in including a depletion mode NMOS transistor 326 in place of the resistor 126, but does not substantially differ therefrom in other points.

The depletion mode NMOS transistor 326 includes a drain connected to the gate of the NMOS transistor 124, a source connected to the source of the NMOS transistor 124, and a gate connected to its own source. The drain of the depletion mode NMOS transistor 326 is further connected to the first terminal of the capacitor 125. The source of the depletion mode NMOS transistor 326 is further connected to the ground terminal 102 and the source of the NMOS transistor 123.

The constant voltage circuit 300 configured in this manner includes, as compared with the constant voltage circuit 200, the depletion mode NMOS transistor 326 in place of the constant current source 226. The function of the depletion mode NMOS transistor 326 does not substantially differ from the function of the constant current source 226. Thus, the operation of the constant voltage circuit 300 does not substantially differ from the operation of the constant voltage circuit 200.

As described above, according to the constant voltage circuit 300 of this configuration example, effects similar to those of the constant voltage circuit 200 can be obtained. That is, according to the constant voltage circuit 300, even in a case in which the parasitic capacitance exists between the drain and source of the depletion mode NMOS transistor 105, with the power supply variation suppression circuit 303, the variation of the output voltage supplied from the first output terminal 110 and the second output terminal 130 in response to a sudden change of the power supply voltage can be reduced.

Further, the variation of the output voltage in response to a sudden change of the power supply voltage can be reduced without complicating the configuration of the constant voltage circuit 300. In addition, while the increase in area caused by the addition of the configuration for reducing the variation of the output voltage in response to a sudden change of the power supply voltage is minimized, it is possible to reduce the variation of the output voltage in response to a sudden change of the power supply voltage.

Third Modification Example

Figure 5:
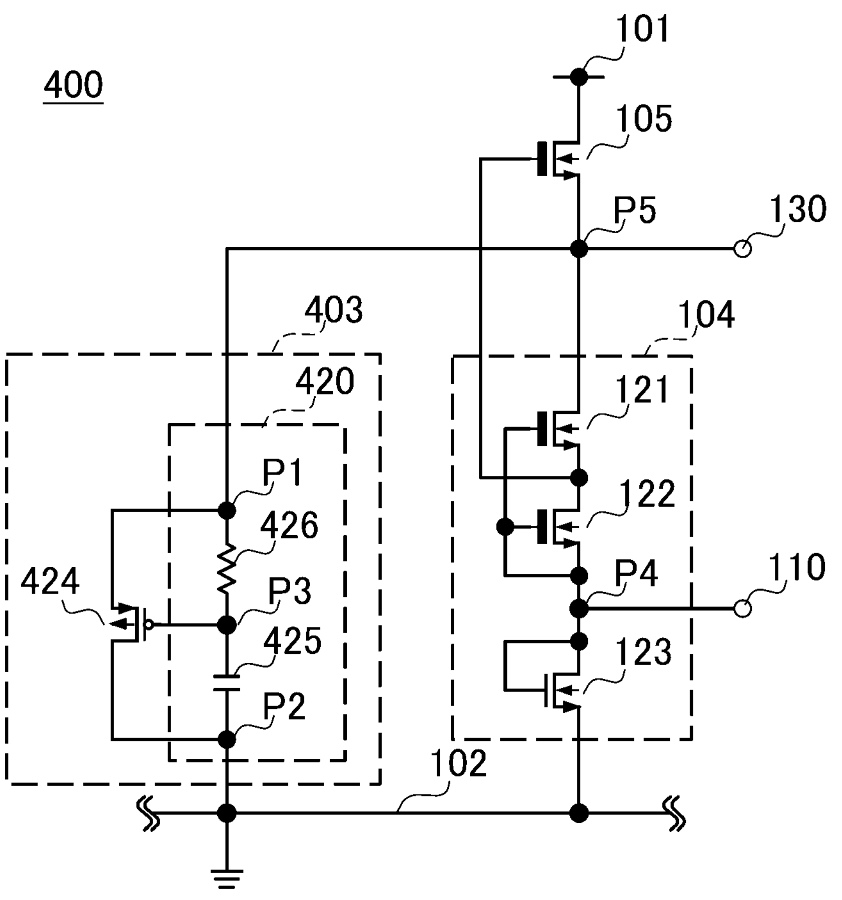
FIG. 5 is a circuit diagram for illustrating a third modification example of the constant voltage circuit according to the embodiments.

FIG. 5 is a circuit diagram of the constant voltage circuit 400 serving as a third modification example of the constant voltage circuit according to the embodiments.

The constant voltage circuit 400 differs from the constant voltage circuit 100 (see FIG. 1) in including a power supply variation suppression circuit 403 in place of the power supply variation suppression circuit 103, but does not substantially differ therefrom in other points. Accordingly, in the description of the third modification example, the power supply variation suppression circuit 403 is mainly described, and components that do not substantially differ from corresponding components of the constant voltage circuit 100 are denoted by the same reference symbols and description thereof is omitted.

The power supply variation suppression circuit 403 includes a detection circuit 420 including a resistor 426 and a capacitor 425, and a P-channel MOS transistor (hereinafter referred to as "PMOS transistor") 424 serving as a pass transistor. The resistor 426 includes a first terminal connected to a source of the PMOS transistor 424 and a second terminal connected to a gate of the PMOS transistor 424. The capacitor 425 includes a first terminal connected to the second terminal of the resistor 426 and a second terminal connected to a drain of the PMOS transistor 424.

A connection point P1 between the resistor 426 and the source of the PMOS transistor 424, that is, the first terminal of the resistor 426, forms a first terminal of the detection circuit 420. A connection point P2 between the capacitor 425 and the drain of the PMOS transistor 424, that is, the second terminal of the capacitor 425, forms a second terminal of the detection circuit 420. A connection point P3 between the capacitor 425 and the resistor 426 forms a third terminal of the detection circuit 420.

The first terminal of the resistor 426 is further connected to the source of the depletion mode NMOS transistor 105, the drain of the depletion mode NMOS transistor 121, and the second output terminal 130. The second terminal of the capacitor 425 is further connected to the ground terminal 102 and the source of the NMOS transistor 123.

Next, an operation of the constant voltage circuit 400 is described.

Under the steady state, the voltage of a connection point P5 is charged in the capacitor 425. No DC current flows through the resistor 426. Thus, a voltage across both terminals of the resistor 426 is 0 V. A voltage between the gate and source of the PMOS transistor 424 is 0 V, and is in an off state.

It is assumed that, for example, the voltage of the power supply terminal 101 has suddenly increased and the voltage of the connection point P5 has increased via a parasitic capacitance existing between the drain and source of the depletion mode NMOS transistor 105. The increased voltage of the connection point P5 causes a charging current to flow through the capacitor 425 and the resistor 426 to increase the source voltage of the PMOS transistor 424. The PMOS transistor 424 is turned on if the voltage between the gate and the source exceeds a threshold voltage, and the connection point P5 and the ground terminal 102 are connected via the PMOS transistor 424. Thus, the increase of the voltage of the connection point P5 is suppressed. Then, the variation of the output voltage of the ED-type reference voltage circuit 104 which uses the voltage of the connection point P5 as the power source, that is, the voltage of the first output terminal 110, is suppressed. Other operations of the constant voltage circuit 400 do not substantially differ from those of the constant voltage circuit 100. Thus, description thereof is omitted.

As described above, according to the constant voltage circuit 400, effects similar to those of the constant voltage circuit 100 can be obtained. That is, according to the constant voltage circuit 400, even in a case in which the parasitic capacitance exists between the drain and source of the depletion mode NMOS transistor 105, with the power supply variation suppression circuit 403, the variation of the output voltage supplied from the first output terminal 110 and the second output terminal 130 in response to a sudden change of the power supply voltage can be reduced.

Further, the variation of the output voltage in response to a sudden change of the power supply voltage can be reduced without complicating the configuration of the constant voltage circuit 400. In addition, while the increase in area caused by the addition of the configuration for reducing the variation of the output voltage in response to a sudden change of the power supply voltage is minimized, it is possible to reduce the variation of the output voltage in response to a sudden change of the power supply voltage.

Fourth Modification Example

Figure 6:
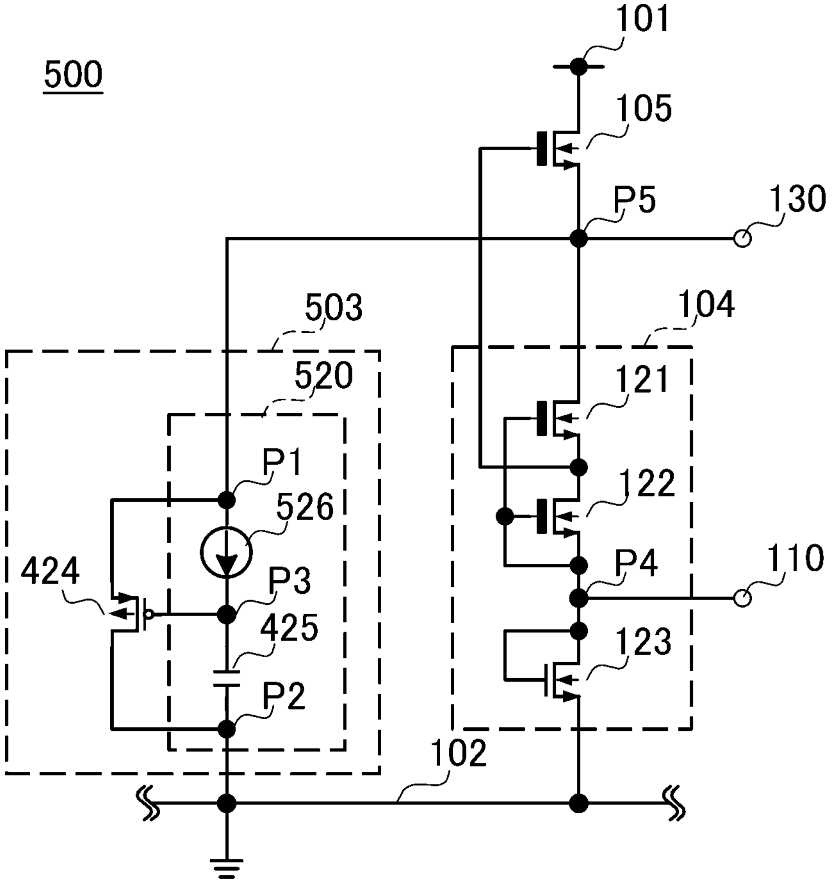
FIG. 6 is a circuit diagram for illustrating a fourth modification example of the constant voltage circuit according to the embodiments.

FIG. 6 is a circuit diagram of the constant voltage circuit 500 serving as a fourth modification example of the constant voltage circuit according to the embodiments.

The constant voltage circuit 500 differs from the constant voltage circuit 400 (see FIG. 5) in including a power supply variation suppression circuit 503 in place of the power supply variation suppression circuit 403, but does not substantially differ therefrom in other points. Accordingly, in the description of the fourth modification example, the power supply variation suppression circuit 503 is mainly described, and components that do not substantially differ from corresponding components of the constant voltage circuit 400 are denoted by the same reference symbols and description thereof is omitted.

The power supply variation suppression circuit 503 differs from the power supply variation suppression circuit 403 in including a detection circuit 520 in place of the detection circuit 420, but does not substantially differ therefrom in other points. The detection circuit 520 differs from the detection circuit 420 in including a constant current source 526 in place of the resistor 426, but does not substantially differ therefrom in other points.

The constant current source 526 includes a first terminal connected to the source of the PMOS transistor 424 and a second terminal connected to the first terminal of the capacitor 425 and the gate of the PMOS transistor 424. The first terminal of the constant current source 526 is further connected to the source of the depletion mode NMOS transistor 105, the drain of the depletion mode NMOS transistor 121, and the second output terminal 130.

Next, an operation of the constant voltage circuit 500 is described.

The constant current source 526 is defined as an element which cannot supply a constant current unless a potential difference exists between its terminals. Under the steady state, the voltage of the connection point P5 is charged in the capacitor 425. A voltage across both terminals of the constant current source 526 is 0 V, and no DC current flows through the constant current source 526. A voltage between the gate and source of the PMOS transistor 424 is 0 V, and is in an off state.

It is assumed that, for example, the voltage of the power supply terminal 101 has suddenly increased and the voltage of the connection point P5 has increased via a parasitic capacitance existing between the drain and source of the depletion mode NMOS transistor 105. At this time, the charging current of the capacitor 425 is limited by the constant current source 526, and a source voltage of the PMOS transistor 424 increases. The PMOS transistor 424 is turned on if the voltage between the gate and the source exceeds a threshold voltage, and the increase of the voltage of the connection point P5 is suppressed. Then, the variation of the output voltage of the ED-type reference voltage circuit 104 which uses the voltage of the connection point P5 as the power source, that is, the voltage of the first output terminal 110, is suppressed. Other operations of the constant voltage circuit 500 do not substantially differ from those of the constant voltage circuit 400. Thus, description thereof is omitted.

As described above, according to the constant voltage circuit 500 of this configuration example, effects similar to those of the constant voltage circuit 100 can be obtained. That is, according to the constant voltage circuit 500, even in a case in which the parasitic capacitance exists between the drain and source of the depletion mode NMOS transistor 105, with the power supply variation suppression circuit 503, the variation of the output voltage supplied from the first output terminal 110 and the second output terminal 130 in response to a sudden change of the power supply voltage can be reduced.

Further, the variation of the output voltage in response to a sudden change of the power supply voltage can be reduced without complicating the configuration of the constant voltage circuit 500. In addition, while the increase in area caused by the addition of the configuration for reducing the variation of the output voltage in response to a sudden change of the power supply voltage is minimized, it is possible to reduce the variation of the output voltage in response to a sudden change of the power supply voltage.

Fifth Modification Example

Figure 7:
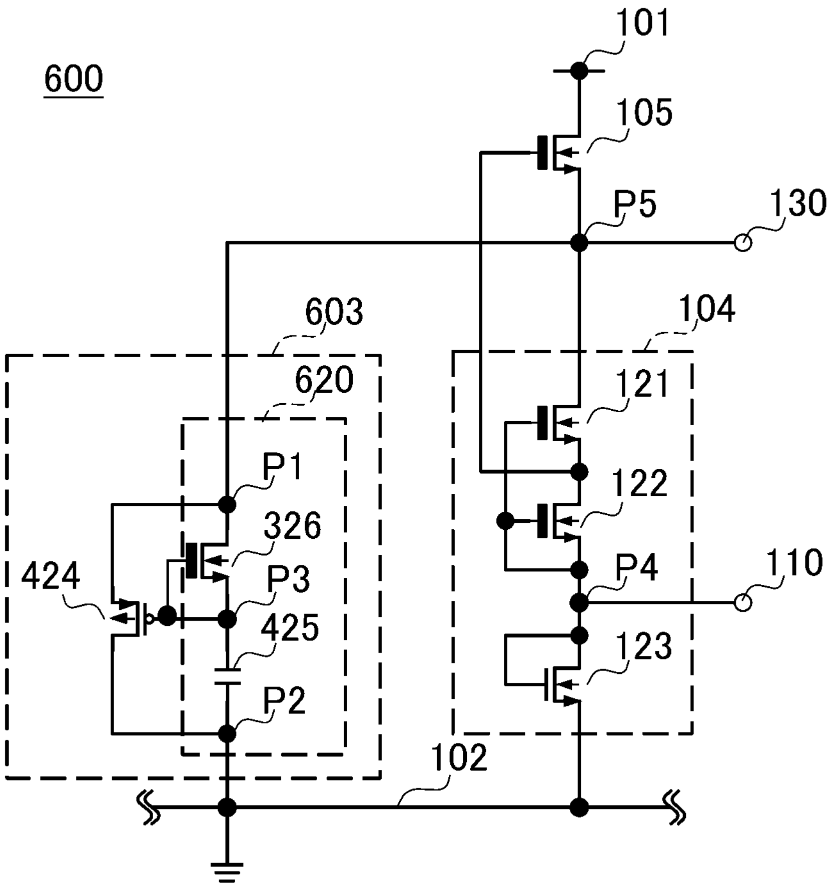
FIG. 7 is a circuit diagram for illustrating a fifth modification example of the constant voltage circuit according to the embodiments.

FIG. 7 is a circuit diagram of the constant voltage circuit 600 serving as a fifth modification example of the constant voltage circuit according to the embodiments.

The constant voltage circuit 600 differs from the constant voltage circuit 500 (see FIG. 6) in including a power supply variation suppression circuit 603 in place of the power supply variation suppression circuit 503, but does not substantially differ therefrom in other points. Accordingly, in the fifth modification example, the power supply variation suppression circuit 603 is mainly described, and components that do not substantially differ from corresponding components of the constant voltage circuit 500 are denoted by the same reference symbols and description thereof is omitted.

The power supply variation suppression circuit 603 differs from the power supply variation suppression circuit 503 in including a detection circuit 620 in place of the detection circuit 520, but does not substantially differ therefrom in other points. The detection circuit 620 differs from the detection circuit 520 in including a depletion mode NMOS transistor 326 in place of the constant current source 526, but does not substantially differ therefrom in other points.

The depletion mode PMOS transistor 326 includes a drain connected to the source of the PMOS transistor 424, a source connected to the gate of the PMOS transistor 424, and a gate connected to its own source. The drain of the depletion mode NMOS transistor 326 is further connected to the source of the depletion mode NMOS transistor 105, the drain of the depletion mode NMOS transistor 121, and the second output terminal 130.

The operation of the constant voltage circuit 600 does not substantially differ from the operation of the constant voltage circuit 500 because the function of the depletion mode NMOS transistor 326 does not substantially differ from the function of the constant current source 526.

As described above, according to the constant voltage circuit 600 of this configuration example, effects similar to those of the constant voltage circuit 500 can be obtained. That is, according to the constant voltage circuit 600, even in a case in which the parasitic capacitance exists between the drain and source of the depletion mode NMOS transistor 105, with the power supply variation suppression circuit 603, the variation of the output voltage supplied from the first output terminal 110 and the second output terminal 130 in response to a sudden change of the power supply voltage can be reduced.

Further, the variation of the output voltage in response to a sudden change of the power supply voltage can be reduced without complicating the configuration of the constant voltage circuit 600. In addition, while the increase in area caused by the addition of the configuration for reducing the variation of the output voltage in response to a sudden change of the power supply voltage is minimized, it is possible to reduce the variation of the output voltage in response to a sudden change of the power supply voltage.

The present invention is not limited to the above-mentioned embodiments, and can be carried out in various forms in addition to the examples described above in the stage of carrying out the invention, and various omissions, additions, replacements, and alterations may be made thereto without departing from the gist of the invention. For example, the constant voltage circuits 100, 200, 300, 400, 500, and 600 described above are each an example in which the first output terminal 110 and the second output terminal 130 are included, but the present invention is not limited thereto. The constant voltage circuits 100, 200, 300, 400, 500, and 600 are each only required to include at least one of the first output terminal 110 or the second output terminal 130.

In the ED-type reference voltage circuit 104, it is only required that the number of depletion mode NMOS transistors connected in series be two or more, and the ED-type reference voltage circuit 104 may include a larger number of transistors. For example, one or more depletion mode NMOS transistors may be further connected in series between the depletion mode NMOS transistor 121 and the depletion mode NMOS transistor 122. In a case in which the number of depletion mode NMOS transistors connected in series is three or more, there are a plurality of connection points between the plurality of depletion mode NMOS transistors connected in series, but the connection destination of the gate of the NMOS transistor 105 may be any one of the connection points between the plurality of depletion mode NMOS transistors. That is, the connection destination of the gate of the NMOS transistor 105 may be any one of the connection points formed from the drain of the depletion mode NMOS transistor 121 to the source of the depletion mode NMOS transistor 122.

These embodiments and modifications thereof are encompassed in the scope and the gist of the invention, and are encompassed in the inventions defined in claims and equivalents thereof.

What is claimed is:

1. A constant voltage circuit, comprising:

a power supply terminal configured to supply a power supply voltage;

a ground terminal;

an ED-type reference voltage circuit including at least a first depletion mode transistor and a second depletion mode transistor, and an enhancement mode transistor, the first depletion mode transistor, the second depletion mode transistor, and the enhancement mode transistor being connected in series and having gates connected to one another;

a third depletion mode transistor connected in series between the power supply terminal and the ED-type reference voltage circuit;

a power supply variation suppression circuit connected between a first connection point and the ground terminal and configured to suppress a variation of the power supply voltage, the first connection point being a connection point between the third depletion mode transistor and the ED-type reference voltage circuit; and an output terminal connected to a connection point which is any one of a second connection point and the first connection point, the second connection point being a connection point between the first depletion mode transistor and the enhancement mode transistor, the power supply variation suppression circuit including:

a detection circuit including a first terminal connected to the first connection point, a second terminal connected to the ground terminal, and a third terminal for supplying a detection signal including a signal level corresponding to whether the variation of the power supply voltage exceeds a set range; and a pass transistor including a gate connected to the third terminal of the detection circuit, a source connected to one of the first terminal and the second terminal of the detection circuit, and a drain connected to another one of the first terminal and the second terminal of the detection circuit, and being switchable between an on state and an off state depending on the signal level applied to the gate.

2. The constant voltage circuit according to claim 1, wherein the detection circuit includes a resistor and a capacitor, the resistor including a first terminal connected to the source of the pass transistor and a second terminal connected to the gate of the pass transistor, the capacitor including a first terminal connected to the gate of the pass transistor and the second terminal of the resistor and a second terminal connected to the drain of the pass transistor.

3. The constant voltage circuit according to claim 1, wherein the detection circuit includes a constant current source and a capacitor, the constant current source including a first terminal connected to the source of the pass transistor and a second terminal connected to the gate of the pass transistor, the capacitor including a first terminal connected to the second terminal of the constant current source and a second terminal connected to the drain of the pass transistor.

4. The constant voltage circuit according to claim 1, wherein the gate of the pass transistor is connected to the third terminal of the detection circuit, the source of the pass transistor is connected to the second terminal of the detection circuit, and the drain of the pass transistor is connected to the first terminal of the detection circuit, and wherein the detection circuit includes a depletion mode N-channel transistor and a capacitor, the depletion mode N-channel transistor including a drain connected to the gate of the pass transistor, a source connected to the source of the pass transistor, and a gate connected to the source of the depletion mode N-channel transistor, the capacitor including a first terminal connected to the drain of the pass transistor and a second terminal connected to the gate of the pass transistor and the drain of the depletion mode N-channel transistor.

5. The constant voltage circuit according to claim 1, wherein the gate of the pass transistor is connected to the third terminal of the detection circuit, the source of the pass transistor is connected to the first terminal of the detection circuit, and the drain of the pass transistor is connected to the second terminal of the detection circuit, and wherein the detection circuit includes a depletion mode N-channel transistor and a capacitor, the depletion mode N-channel transistor including a drain connected to the source of the pass transistor, a source connected to the gate of the pass transistor, and a gate connected to the source of the depletion mode N-channel transistor, the capacitor including a first terminal connected to the gate of the pass transistor and the gate and source of the depletion mode N-channel transistor and a second terminal connected to the drain of the pass transistor.

6. The constant voltage circuit according to claim 1, further comprising an operational amplifier including:

a first power supply terminal connected to the first connection point;

a second power supply terminal connected to the ground terminal;

an amplified output terminal;

a first input terminal connected to the amplified output terminal; and a second input terminal connected to the second connection point.

* * * * *